United States Patent [19]
Ikeda et al.

[11] Patent Number: 4,694,306
[45] Date of Patent: Sep. 15, 1987

[54] LIQUID JET RECORDING HEAD WITH A PROTECTIVE LAYER FORMED BY CONVERTING THE SURFACE OF A TRANSDUCER INTO AN INSULATING MATERIAL

[75] Inventors: Masami Ikeda, Machida; Hiroto Matsuda, Ebina; Hiroto Takahashi; Tatsumi Shohji, both of Hiratsuka, all of Japan

[73] Assignee: Canon Kabushiki Kaisha, Tokyo, Japan

[21] Appl. No.: 867,890

[22] Filed: May 20, 1986

Related U.S. Application Data

[63] Continuation of Ser. No. 575,678, Jan. 31, 1984, abandoned.

[30] Foreign Application Priority Data

Feb. 5, 1983 [JP] Japan ................................ 58-16900

[51] Int. Cl.[4] ............................................ G01D 15/18
[52] U.S. Cl. .................................. 346/140 R; 346/1.1
[58] Field of Search .................... 346/140, 76 PH, 1.1

[56] References Cited

U.S. PATENT DOCUMENTS

| | | | |
|---|---|---|---|
| 3,973,106 | 8/1976 | Ura | 219/216 |
| 4,335,389 | 6/1982 | Shirato | 346/140 X |
| 4,392,907 | 7/1983 | Shirato | 346/140 X |
| 4,450,457 | 5/1984 | Miyachi | 346/140 |
| 4,535,343 | 8/1985 | Wright | 346/140 |

*Primary Examiner*—Joseph W. Hartary
*Attorney, Agent, or Firm*—Fitzpatrick, Cella, Harper & Scinto

[57] ABSTRACT

A liquid jet recording head comprises a liquid discharging portion having an orifice for discharging liquid to form liquid droplets and a heat acting zone communicated with said orifice at which heat energy for forming flying liquid droplets acts on the liquid, and an electrothermal transducer, having at least a pair of confronting electrodes connected electrically to a heat generating resistance layer provided on a substrate thereby to form a heat generating portion between these electrodes, which includes a protecting layer which is formed by modification of the surfaces of said electrodes and is made into an insulating inorganic material.

4 Claims, 7 Drawing Figures

LIQUID JET RECORDING HEAD WITH A PROTECTIVE LAYER FORMED BY CONVERTING THE SURFACE OF A TRANSDUCER INTO AN INSULATING MATERIAL

This application is a continuation of application Ser. No. 575,678, filed Jan. 31, 1984, now abandoned.

BACKGROUND OF THE INVENTION

1. Field of the Invention

This invention relates to a liquid jet recording head which performs recording by jetting a liquid to form flying liquid droplets.

2. Description of the Prior Art

Ink jet recording methods (liquid jet recording methods) are recently attracting attention for such advantages that generation of noise during recording is negligible, that high speed recording is possible and also that recording can be done on so-called plain paper without need of a special treatment for fixing.

Such liquid jet recording methods are disclosed in, for example, Japanese Laid-open Patent Application No. 51837/1979, Deutsche Offenlegungsschrift (DOLS) No. 24843064 which have a specific feature different from other liquid jet recording methods in that the driving force for discharging liquid droplets is obtained by permitting heat energy to act on a liquid.

That is to say, according to the recording method disclosed in the above patent specifications, liquid which has received action of heat energy undergoes a change in state accompanied with an abrupt increase of volume, and through the acting force resulting form the change in state is discharged through the orifice at the tip end of the recording head portion to be formed into flying liquid droplets, which are attached onto a material to be recorded, thereby effecting recording thereon.

In particular, the liquid jet recording method disclosed in DOLS No. 2843064 is not only applicable very effectively for the so-called drop-on demand recording method, but also can easily be embodied into a recording head in which the recording head portion is made into a high density multi-orifice of full line type, thus being capable of giving images of high resolution and high quality at high speed.

The recording head portion of the device to be applied for the above-mentioned method has a liquid discharging portion having an orifice provided for discharging liquid and a liquid pathway, which is communicated with the orifice and has a heat acting zone at which heat energy acts on liquid for discharging liquid droplets, and an electrothermal transducer as a means for generating heat energy. And, the electrothermal transducer has a pair of electrodes and a heat generating resistance layer which is connected to these electrodes and has a region for heat generation (heat generating portion) between these electrodes.

A typical example exhibiting the structure of such a liquid jet recording head is shown in FIG. 1(A) and FIG. 1(B). FIG. 1(A) is the front view of a liquid jet recording head as viewed from the orifice side, and FIG. 1(B) is a partial sectional view of FIG. 1(A) when cut along the broken line X - Y.

The recording head 101 has a structure having orifices 105 and liquid discharging sections 106 formed by bonding a grooved plate 104 provided with a certain number of grooves of certain width and depth at a predetermined line density to a substrate 103 provided on its surface with an electrothermal transducer 102 so as to cover over the surface of the substrate 103. In the case of the recording head as shown in the drawing, it is shown as having a plural number of orifices 105. Of course, the present invention is not limited to such embodiments, but also a recording head with a single orifice is included in the category of the present invention.

The liquid discharging section 106 has an orifice 105 for discharging liquid at its terminal end and a heat acting zone 107, which is the place where heat energy generated from an electrothermal transducer 102 acts on liquid therein to generate bubbles and cause adrupt change in state through expansion and shrinkage of its volume. The heat acting zone 107 is positioned above the heat generating portion 108 of the electrothermal transducer 102 and has a heat acting face 109 to be contacted with the liquid at the heat generating portion 108 as its bottom surface.

The heat generating portion 108 is constituted of a lower layer 110, a heat generating resistance layer 111 provided on the lower layer 110 and an upper layer 112 provided on the heat generating resistance layer 111. The heat generating resistance layer 111 is provided on its surface with electrodes 113 and 114 for passage of current to the layer 111. The electrode 113 is common to the heat generating portions of the respective liquid discharging portions, while the electrode 114 is a selective electrode for selecting the heat generating portion of each liquid discharging portion for heat generation and is provided along the liquid pathway of the liquid discharging portion.

The upper layer 112 has the function of separating the heat generating resistance layer 111 from the liquid filling the liquid pathway of the liquid discharging portion for protection of the heat generating resistance layer 111 chemically or physically against the liquid employed at the heat generating portion 108, and also has the protective function for the heat generating resistance layer 111 to prevent short-circuit through the liquid between the electrodes 113 and 114.

The upper layer 112 also serves to be under charge of preventing electrical leak between adjacent electrodes. In particular, prevention of electrical leak between the respective selective electrodes or prevention of electric corrosion, which will occur by passage of current between the electrode under each liquid pathway and the liquid which may happen to be contacted for some reason, is important and for this purpose the upper layer 112 having such a protective function is provided at least on the electrode existing under the liquid pathway.

Further, the liquid pathway provided at each liquid discharging portion is connected upstream thereof to the common liquid chamber for storage of the liquid to be supplied to said liquid pathway, and the electrode connected to the electrothermal transducer provided at each liquid discharging portion is generally provided for convenience in designing so that it may pass beneath the aforesaid common liquid chamber on the side upstream of the heat acting zone.

Accordingly, it is generally practiced to provide the upper layer as described even at this portion in order to prevent contact between the electrode and the liquid.

Whereas, the above-mentioned upper layer 112 is required to have characteristics which are different depending on the place at which it is to be provided.

For example, at the heat generating portion 108, it is required to be excellent in (1) heat resistance, (2) liquid resistance, (3) liquid penetration preventing characteristics, (4) thermal conductivity, (5) antioxidant properties, (6) breaking resistance, while in regions other than the heat generating portion 108, it is required to be excellent sufficiently in liquid penetration preventing characteristics, liquid resistance and breaking resistance, although thermal conditions may be somewhat undemanding.

However, there is nowadays no material for constituting the upper layer which can satisfy all of the above characteristics (1) to (6) as desired, and under the present situation, some of the characteristics (1) to (6) are placed under alleviated requirements.

That is to say, the choice of material in the heat generating portion 108 is done with preference for characteristics (1), (4) and (5), while in other portions than the heat generating portion 108, for example, the electrode portion, the choice of material should be done with preference for characteristics (2), (3) and (6), thus forming the upper layers with the use of corresponding materials on the respective regional faces.

On the other hand, as different from these, in the case of a multi-orifice type liquid jet recording head, formation of respective layers and partial removal of the layers formed are conducted repeatedly on a substrate in the manufacturing step for the purpose of forming a number of minute electrothermal transducers at the same time on the substrate. At the stage when the upper layer is formed, the surface on which the upper layer is to be formed is formed in minute projection-recess shape with a slab wedge portion (or stepped portion), and therefore the step coverage characteristic of the upper layer at this stepped portion becomes important.

In short, if the step coverage characteristic at this stepped portion is bad, penetration of liquid will occur at that portion, whereby electric corrosion or breaking of electric insulation may be induced.

Also, when the upper layer is susceptible to occurrence of failures at a high probability in the manufacturing steps, liquid will penetrate through the failures to cause markedly reduced life of the electrothermal transducer.

For the reasons mentioned above, the upper layer is also required to have good coverage characteristics at the stepped portion, with a low probability of occurrence of pinholes in the layer formed, to the such probability is negligible or less.

However, in the prior art, no satisfactory liquid bubble jet recording head has been proposed, which can satisfy all of these requirements and is excellent in overall use durability.

SUMMARY OF THE INVENTION

The present invention has been accomplished in view of the various points as mentioned above and an object of the present invention is to provide a liquid jet recording head which is excellent in overall durability in frequently repeated use or continuous use for a long time and can maintain stably the initial good liquid droplet forming characteristic for a long term.

Another object of the present invention is to provide a liquid jet recording head which is highly reliable in manufacturing working.

Further, it is also another object of the present invention to provide a liquid jet recording heat which is high in yield also when made into a multi-orifice type.

According to an aspect of the present invention, there is provided a liquid jet recording head, comprising a liquid discharging portion having an orifice for discharging liquid to form flying liquid droplets and a heat acting zone communicated with said orifice at which heat energy for forming said liquid droplets acts on the liquid therein, and an electrothermal transducer, having at least a pair of confronting electrodes connected electrically to a heat generating resistance layer provided on a substrate thereby to form a heat generating portion between these electrodes, which comprises having a protecting layer which is formed by modification of the surfaces of said electrodes and is also made into an insulating inorganic material.

DETAILED DESCRIPTION OF THE PREFERRED EMBODIMENT

Figure 1B:
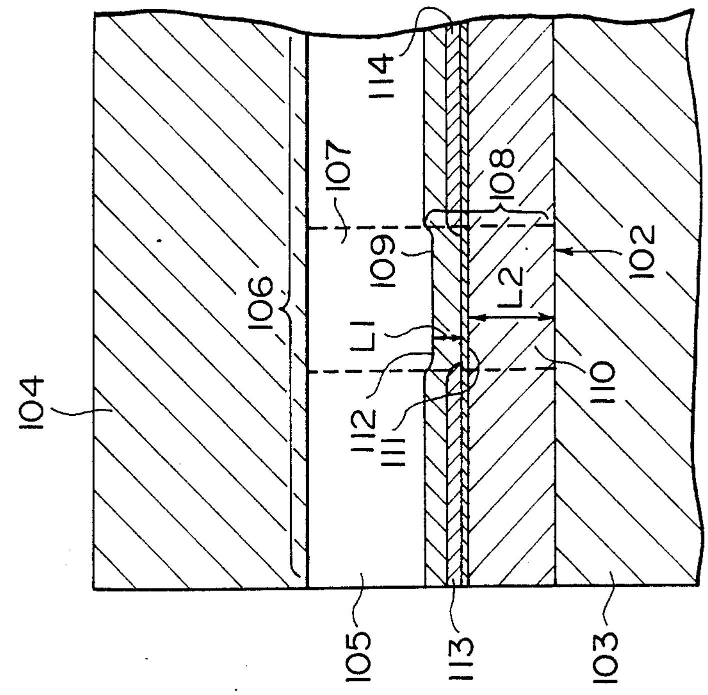
FIG. 1B PRIOR ART
FIG. 1(A) and (B) are each presented for illustration of the constitution of a liquid jet recording head of the prior art, FIG. 1(A) showing a schematic partial front view and FIG. 1(B) partial sectional view taken along the broken line X - Y in FIG. 1(A)

Referring now to the drawings, the present invention is to be described in detail.

Figure 1A:
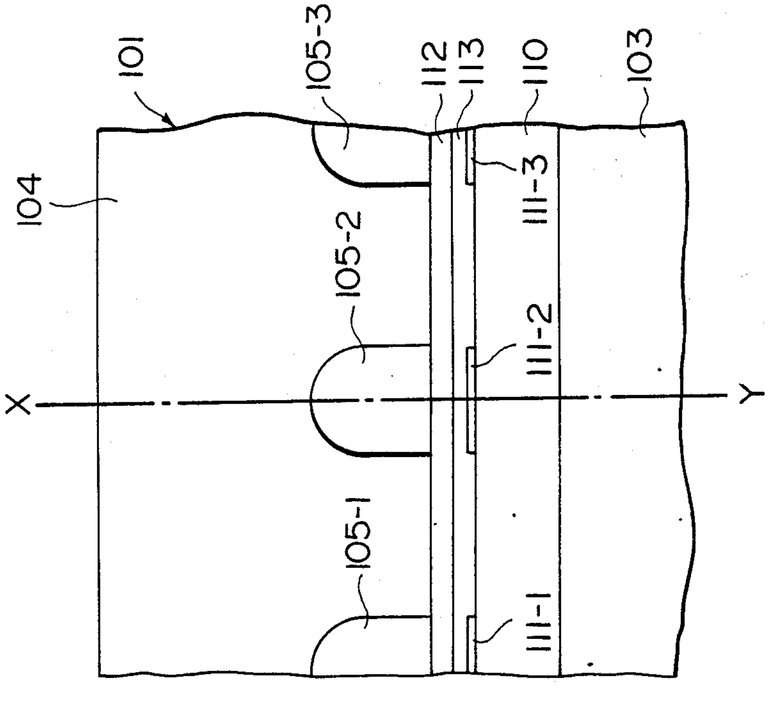
FIG. 1A PRIOR ART
Figure 2A:
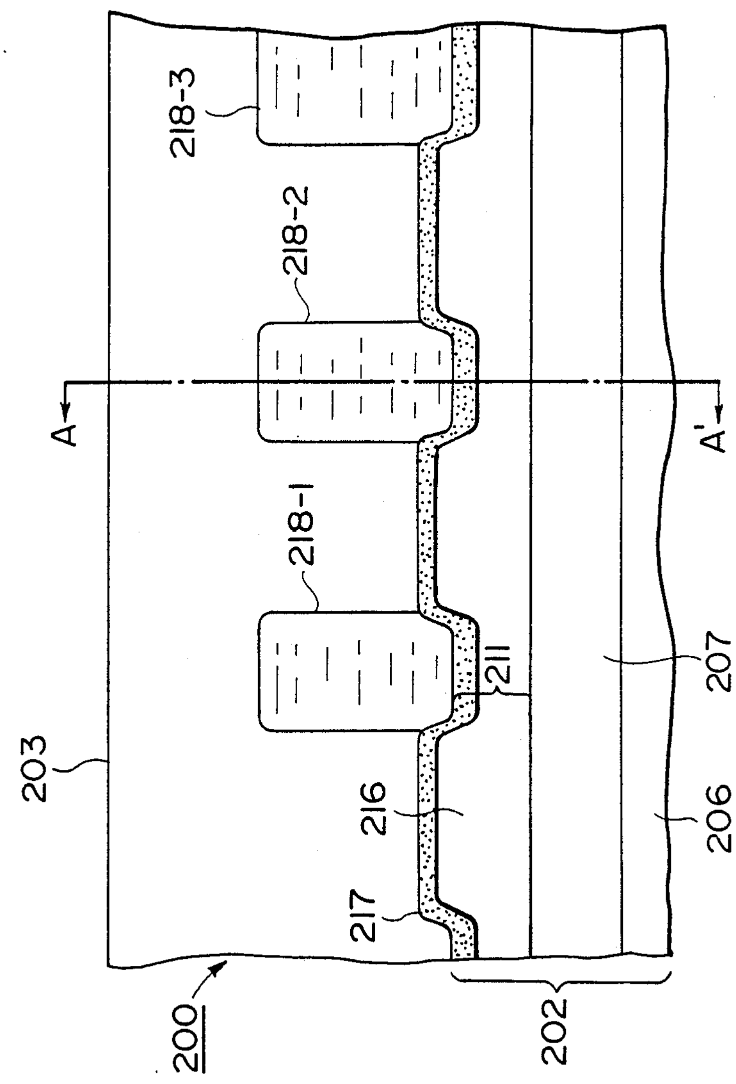
FIG. 2(A), (B), (C) and (D) are each presented for illustration of an embodiment of the recording head according to the present invention, FIG. 2(A) showing a schematic front view, FIG. 2(B) a sectional view partially cut taken along the chain line A-A' in FIG. 2(A), FIG. 2(C) a sectional view partially cut taken along the chain line B-B' in FIG. 2(B) and FIG. 2(D) a schematic plan view of a substrate.
Figure 2B:
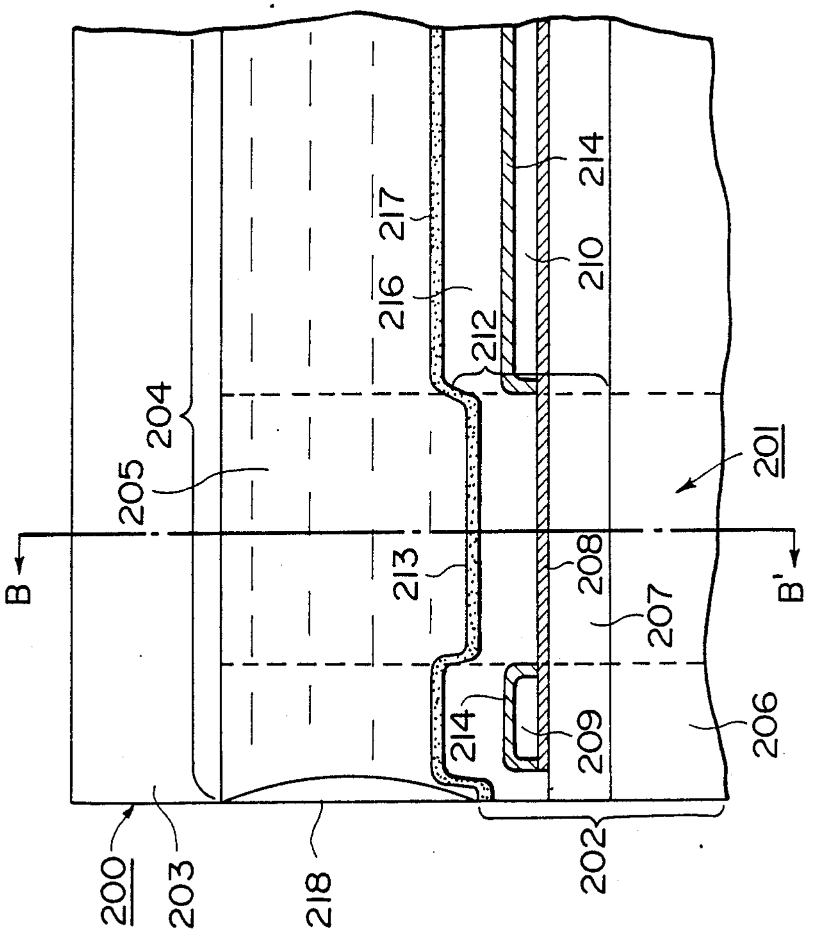

FIG. 2(A) shows a partial front view of a liquid jet recording head as seen from the orifice side for illustration of a principal part of the structure according to a preferred embodiment of the present invention; and FIG. 2(B) shows a partial sectional view when taken along the chain line A-A' in FIG. 2(A). FIG. 2(A) thus generally corresponds to FIG. 1(A) as described previously, while FIG. 2(B) generally corresponds to FIG. 1(B).

The liquid jet recording head 200 shown in the drawings is constituted at its main part of a substrate 202 for liquid jet recording (Thermal ink jet: hereinafter abbreviated as T/J) utilizing heat for liquid discharging provided with a desired number of electrothermal transducers 201 and a grooved plate 203 having a desired number of grooves provided corresponding to said electrothermal transducer 201.

The T/J substrate 202 and the grooved plate 203 are bonded to each other at predetermined positions with an adhesive or other means, whereby a liquid pathway 204 is formed by the portion of the T/J substrate 202 on which the electrothermal transducer 201 is provided and the groove portion of the grooved plate 203, said liquid pathway 204 having a heat acting zone 205 as a part of its constitution.

The T/J substrate 202 has a support 206 constituted of silicon, glass, ceramics, etc., a lower layer 207 constituted of $SiO_2$, etc. provided on said support 206, a heat generating resistance layer 208, electrodes 209 and 210 provided along the liquid pathway 204 on both sides of the upper surface of the heat generating resistance layer 208, and a protection layer (upper layer) 211 constituted of an inorganic material which covers over the portion of the heat generating resistance layer which is not covered with electrodes and the portions of electrodes 209 and 210.

The electrothermal transducer 201 has a heat generating section 212 as its main part, and the heat generating section 212 is constituted of laminates provided successively from the side of the support 206, namely a lower layer 207, a heat generating layer 208, an upper layer portion 211, and the surface 213 (heat acting face) of the upper layer 211 is contacted directly with the liquid filling the liquid pathway 204.

In the case of the liquid jet recording head 200 shown in FIG. 2, the upper layer 211 is made into a double layer structure having layer 216 and 217 provided for further enhancement of the mechanical strength of said layer 211. The layer 216 is constituted of an inorganic material which is relatively excellent in electrical insulation, thermal conductivity and heat resistance, for example, inorganic oxides such as $SiO_2$, etc. and inorganic nitrides such as $Si_3N_4$, etc., while the layer 217 is constituted of a material which is tenacious, relatively excellent in mechanical strength and can be adhered to the layer 216. For example, when the layer 216 is constituted of $SiO_2$, the layer 217 is constituted of a metal material such as Ta.

Thus, by constituting the surface layer of the upper layer 211 of an inorganic material such as a metal which is relatively tenacious and has a mechanical strength, the shock from the cavitation action generated on liquid discharging can sufficiently be absorbed, whereby there is the effect of prolonging the life of the electrothermal transducers 201 to a great extent.

However, the upper layer 217 provided as the surface layer of the upper layer 211 is not necessarily required.

The present invention is characterized by providing a protective layer 214 made into an inorganic insulating material on the surfaces of the electrodes 209 and 210 by modification of the electrode surfaces. The protective layer 214 is provided also on at least the bottom portion of the common liquid chamber to be provided upstream of the liquid pathway 204 on the line extended from the electrode 210, which is not shown in the drawings.

The protective layer 214 is provided on the surfaces of the electrode portions and its primary functions are prevention of liquid penetration and liquid resistant action. Further, by providing the protective layer so as to cover over the electrode wiring portion behind the common liquid chamber, it is possible to prevent generations of failures or wire breaking at the electrode wiring portion which may occur during the manufacturing step.

The protective layer 214 is constituted of an inorganic insulating material so that it can fulfill the functions as described above. Further, desirable properties to be possessed by the protective layer are:

(1) good film forming property;
(2) dense structure without pinholes or cracks;
(3) no denaturation or no solubility in the ink employed;
(4) good insulating property when formed into a film;
(5) high heat resistance.

Such inorganic insulating materials may include, for example, oxides, carbides, nitrides and borides of metals such as Al, Ta, Ti, Zr, Hf, V, Nb, Mg, Si, Mo, W, Y, La, etc. and alloys thereof. Any other material may also be available, provided that an inorganic insulating material may be formed on the electrode surface densely without formation crack or pinhole.

As the preferable method for providing the protective layer 214 on the electrode surface, a coated layer of an oxide is formed on the electrode surface by anodic oxidation of the electrode portion, as shown in Example hereinafter described. The oxide layer of the metal formed according to this method gives the ideal coated layer satisfying the physical properties as described above required for the protective layer. Formation of an oxide layer may also be effected by heating oxidation in oxygen or chemical oxidation with an oxidizing agent. Modification of the surface is not limited to formation of an oxide layer but it may alternatively include formation of a nitride, boride or carbide layer.

As the material constituting the upper layer 211, there may be included, in addition to the inorganic materials as mentioned above, transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide, manganese oxide and the like; metal oxides such as aluminum oxide, calcium oxide, strontium oxide, barium oxide, silicon oxide and complexes thereof; high resistance nitrides such as silicon nitride, aluminum nitride, boron nitride, tantalum nitride, etc. and complexes of these oxides and nitrides; further thin film materials such as semiconductors of amorphous silicon, amorphous selenium, etc. which have low resistance as bulk but can be made to have high resistance during the manufacturing steps such as by the sputtering method, the CVD method, the vapor deposition method, the gas phase reaction method, the liquid coating method and others. Its layer thickness may be preferably 0.1 to 5 $\mu m$, more preferably 0.2 to 3 $\mu m$.

In the case of the embodiment shown in FIG. 2(A) and (B), both of the protective layer 214 and the upper layer 211 are provided. However, in the present invention, the upper layer 211 is not necessarily laminated, but the object and the effect of the present invention as described above can be accomplished only if the electrodes are protected from the liquid by the protective layer 214 formed on the surface of the electrodes.

The embodiment shown in FIG. 2(A) and (B) is a preferred embodiment of the present invention, and the coated layer constituted of a combination of the upper layer and the protective layer, together with the various constitutions of other portions as described below, can provide a liquid jet recording head which is excellent in overall use durability, high in reliability in manufacturing and working and is also high in production yield when made into a multi-orifice type.

The lower layer 207 is provided as a layer for controlling the flow of heat generated primarily from the heat generating portion 212 toward the side of the support 206. Choice of the material and designing of the layer thickness for the lower layer are done so that, when heat energy is permitted to act on liquid at the heat acting zone 205, the heat generated from the heat generating portion 212 may be controlled to flow in greater amount toward the side of heat acting zone, while when current passage to the electrothermal transducer 201 is turned off, the heat remaining in the heat generating portion 212 may flow rapidly toward the side of the support 206. Examples of the materials constituting the lower layer 207 may including $SiO_2$ as previously mentioned and inorganic materials, typically metal oxides such as tantalum oxide, magnesium oxide, aluminum oxide and the like.

For the material constituting the heat generating resistance layer 208, it is possible to employ most of the materials which can generate heat as desired by passage of current.

More specifically, such materials may include, for example, tantalum nitride, nickel-chromium, silver-palladium alloy, silicon semiconductors, or metals such as hafnium, lanthanum, zirconium, titanium, tantalum, tungsten, molybdenum, niobium, chromium, vanadium, etc., alloys thereof and borides thereof as preferable ones.

Among the materials constituting the heat generating resistance layer 208, especially a metal boride may be mentioned as excellent one, and above all hafnium boride has the best characteristic, and next to this compound there are zirconium boride, lanthanum boride, vanadium boride and niobium boride with better characteristic in the order mentioned.

The heat generating resistance layer 208 can be formed by use of the materials as mentioned above according to the method such as electron beam vapor deposition or sputtering.

The materials for constituting the electrodes 209 and 210 may include electroconductive materials capable of forming inorganic insulating material layers which are dense without pinhole on their surfaces, such as Al, Ta, Ti, Mg, Hf, Zr, V, W, Mo, Nb, Si, and alloys thereof. By use of these metals, the electrodes are provided at predetermined positions according to the method such as vapor deposition to desired sizes, shapes and thicknesses.

As the material constituting the constituent member for the common liquid chamber provided on the side upstream of the grooved plate 203 and the heat acting zone 205, most of the materials are effectively available, provided that they are free or substantially free from distortion by the heat during operation of the recording head or under environment during usage and capable of being easily applied with precision with its face being easily and precisely easily attained, and further can be worked so that the liquid may flow smoothly through the pathways formed by such workings.

Figure 2C:
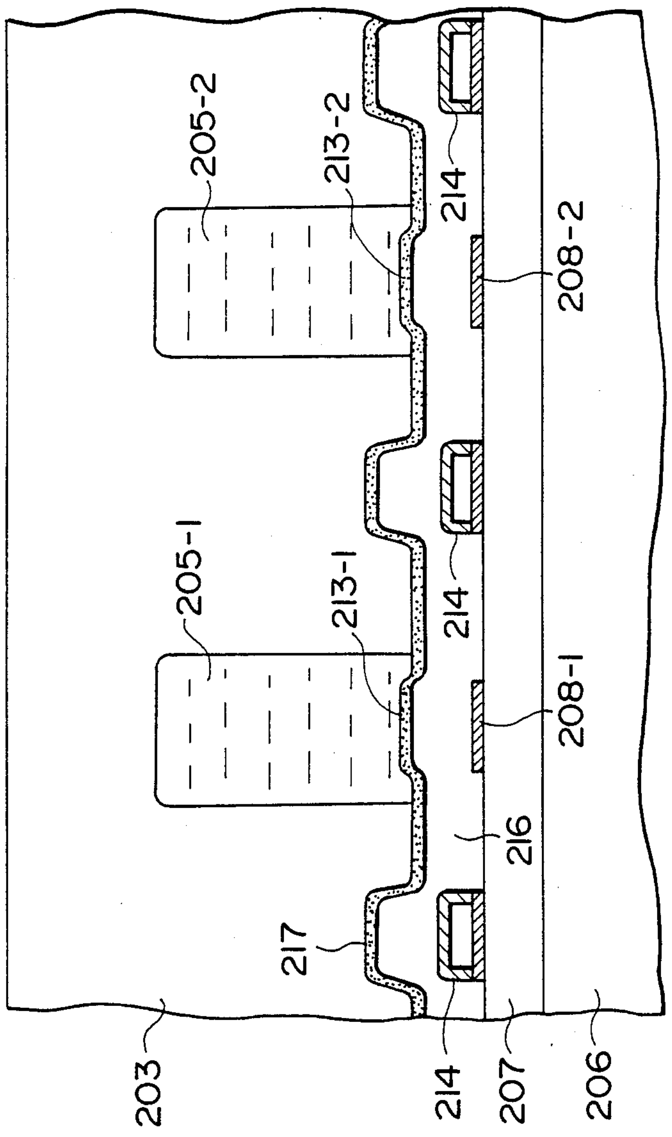

FIG. 2(C) is a partial sectional view taken along the chain line B-B' shown in FIG. 2(B).

In the liquid jet recording head 200, as shown in FIG. 2(B), the protective layer 214 is provided in contact with the heat acting surface 213 of the liquid pathway 204, but as a modification example, the protective layer 214 can also be provided apart from the heat acting surface 213.

The present invention is now described by referring to an Example.

EXAMPLE

An Si wafer was thermally oxidized to be formed into a $SiO_2$ film with a thickness of 5 $\mu$m to provide a substrate. On the substrate was formed by sputtering a heat generating resistance layer of $HfB_2$ to a thickness of 1500 Å, followed successive deposition of a Ti layer of 50 Å and an Al layer of 10,000 Å according to electron beam vapor deposition.

Figure 2D:
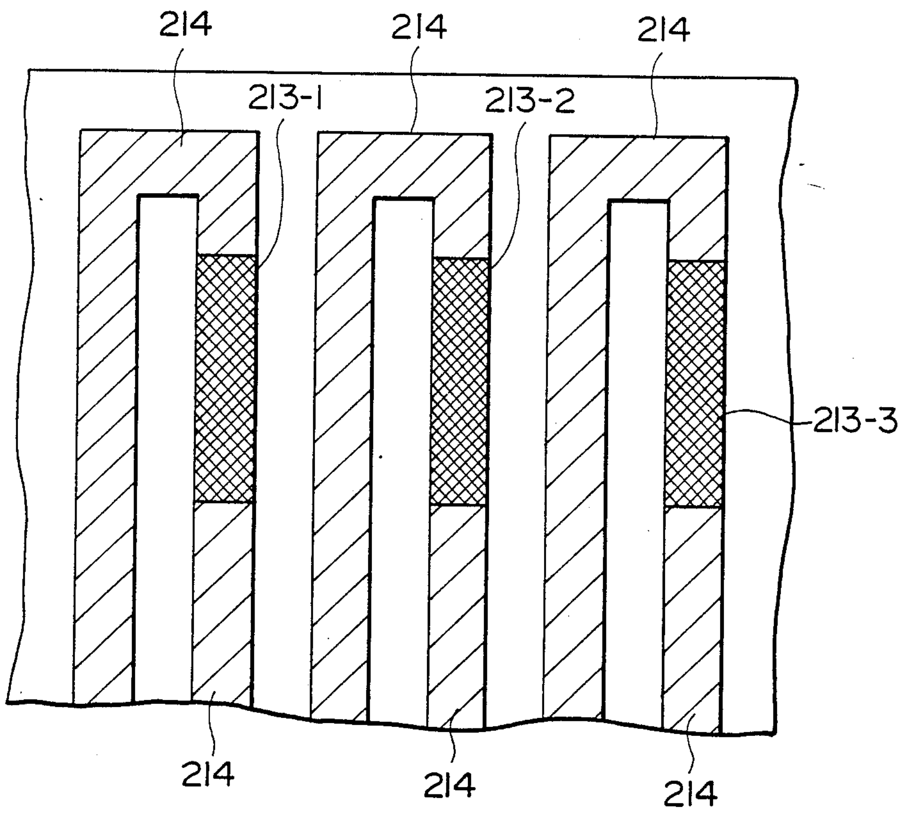

By way of photolithographic steps, the pattern as shown in FIG. 2(D) was formed and the size of the heat acting face was found to be 30 $\mu$m in width and 150 $\mu$m in length, with the resistance being 150 ohm, including the resistance of the Al electrodes.

As the next step, only the Al electrode portion was oxidized to a thickness of 5000 Å anodically, excluding the bonding take-out portion. In the following, the step of anodic oxidation of the Al electrode is described.

A support having formed the heat generating resistance layer and electrodes to predetermined patterns thereon was washed and dried, followed by spinner coating of a photoresist OMR-83 (produced by Tokyo Oka Co.). After drying, the product was exposed to light by means of a mask aligner and subjected to developing treatment to obtain a desired pattern for anodic oxidation.

Then, by using a 10% $H_3PO_4$ solution, anodic oxidation was effected at a bath temperature of 10° C., a current density of 5 mA/cm$^2$, with Pt as the counter-electrode, for 5 minutes (during anodic oxidation, the sample was fixed and the electrolytic bath was sufficiently stirred with a stirrer). After washing with water and drying, the photoresist was peeled off with a peeling solution for OMR, followed by thorough washing and drying, to complete the step for formation of the oxidized layer.

Subsequent to formation of the oxidized anode layer an, $SiO_2$ sputter layer was deposited thereon to a thickness of 2.2 $\mu$m according to a high rate sputtering, followed further by lamination of a Ta layer to 0.5 $\mu$m by sputtering of Ta. On the resultant T/J substrate was adhered a grooved glass plate as scheduled. Thus, similarly as shown in FIG. 2(B), there is a grooved glass plate (50 $\mu$m$\times$50 $\mu$m, length 2 mm) for formation of the ink introducing pathway and the heat acting zone adhered onto the T/J substrate.

Thus, a liquid jet recording head was prepared.

When a square wave voltage of 10 $\mu$S, 30 V was applied at 800 Hz on the electricity-heat converter of the thus prepared recording head, the liquid was discharged in correspondence to the applied signals to form flying liquid droplets stably.

When formation of such droplets is repeated, breaking of wire may occur in a head badly manufactured due to electric corrosion of Al electrodes or breaking of insulation between the Ta protective layer and Al electrodes until no ink is discharged. The number of repetition by this time is defined as the durable number in the present invention.

The durable numbers and the product yields were determined for the three examples of:

(a) the recording head according to the Example of this invention, (b) the recording head prepared without formation of the anodic oxide layer (Control) and (c) the recording head according to one of embodiments of the present invention, which is the same as this Example except that the anodic oxide layer is formed apart from the heat acting surface, to obtain the results as shown in Table 1 (the evaluation was performed for each 1000 Samples). The product yields are the results of the short check between the Ta layer and the wiring portion.

TABLE 1

| Sample | Yield | Durable Number | | |
|---|---|---|---|---|
| | | $10^7$ or more | $10^7$–$10^9$ | $10^9$ or more |
| (a) | 97% | 0% | 0.3% | 99.7% |
| (b) | 55% | 75% | 24% | 1% |
| (c) | 93% | 0% | 3.4% | 96.6% |

As apparently seen from the results as shown in Table 1, the durable number of $10^9$ times can be attained steadily in the head according to this invention. Therefore, it is suitable for use as a multi-head. In the head (b), deterioration of durability was markedly seen due to electric corrosion of Al electrodes by penetration of the recording liquid through the pinholes in the sputtered layer of $SiO_2$ and Ta and breaking of insulation between the Al electrode and Ta layer. In the head (c), both yield and durable number were inferior to the case (a) due to the fact that much breaking occurred at the interface between the heat generating resistor and the wiring portion and the step coverage of $SiO_2$ was poor at this portion. It is possible to make its durability reliability to that of the head (a) by reducing the film material at the wiring portion.

Namely, by forming the protective group by changing the electrode surface to an inorganic insulating material as in the present invention, reliability and yield can be extremely improved. This tendency is further marked in improvement of reliability in a head using an upper protective layer having good electroconductivity such as of Ta as the inorganic layer, whereby there is no lowering in durability through destruction of insulation between the Al lead electrode and the Ta electroconductive pretective layer at all.

In this Example, the anodic layer was formed by using electrochemical anodic oxidation, but it is also possible to form an oxidized layer by heating oxidation, provided that there is no adverse influence on other portions. Alternatively, the oxidized layer may also be formed by chemical oxidation such as the surface treatment with an oxidizing agent, provided that there is no problem with respect to the film quality.

Further, the inorganic insulating material 214 is not limited to an oxide, but a nitride, boride or carbide may also be used.

Figure 3:
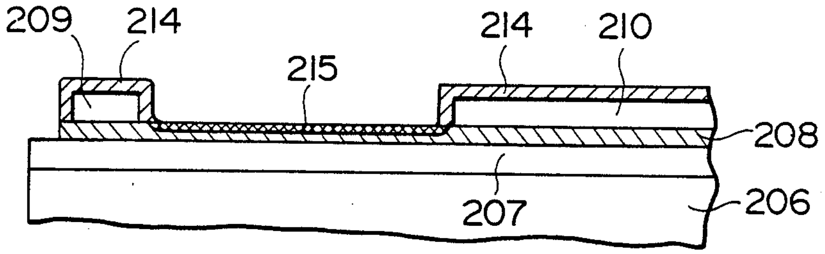
FIG. 3 is a schematic plan view showing the principal part of another embodiment of the present invention.

Also, in this Example, the heat acting surface 213 was subjected to patterning during anodic oxidation for preventing oxidation thereof, but in the case when oxidation of the heat generating resistor 208 is negligible or when it is made negligible by the substrate design such as increase of the film thickness of the heat generating resistor 208, no patterning is necessary. FIG. 3 is a sectional view partially cut of the heat acting surface 213 when anodic oxidation was done without patterning corresponding to FIG. 2(B).

Further, the anodic oxidation in this Example is the method by use of a phosphoric acid bath. This may be substituted by any electrolytic bath capable of forming a protective film having the properties as described above, such as of sulfuric acid, oxalic acid, citric acid, tartaric acid, chromic acid, boric acid and others, or a mixed bath thereof. The electrolytic conditions are not limited, provided that the above mentioned characteristics can be obtained in the layer 214, 215 formed. Further, it is also possible to apply pore sealing treatment or effect pore filling by secondary electrolysis in a neutral bath such as of boric acid +sodium borate, etc. for the purpose of reducing pinholes, whereby a further improved film can be obtained.

The method for forming the protective layer in the present invention is also inclusive of the method, in which a layer of a material capable of forming readily an oxidized film is formed on a wiring material which can hardly form an oxidized product such as Au, Pt, Ag, etc. by vapor deposition, sputtering, CVD, etc. and thereafter only the layer is oxidized to form a protective layer.

What we claim is:

1. A liquid jet recording head comprising:

a liquid discharging portion having an orifice for discharging liquid to form flying liquid droplets and a heat acting zone communicating with said orifice at which heat energy for forming said liquid droplets can act on the liquid therein, and an electrothermal transducer including at least a pair of confronting electrodes connected electrically to a heat generating resistance layer provided on a substrate to form a heat generating portion between said electrodes and a protective layer formed by a reaction that converts material comprising said electrothermal transducer into an insulating inorganic material, wherein said reaction comprises at least one of oxidation, nitriding, boriding and carbiding of said electrothermal transducer at the surface thereof to convert said surface into at least one of an oxide, a nitride, a boride and a carbide, respectively, of the material comprising electrothermal transducer.

2. A liquid jet recording head according to claim 1, wherein said reaction comprises anodic oxidation of the surfaces only of said electrodes.

3. A method of making a liquid jet recording head comprising:

providing a liquid jet recording head with a liquid discharging portion having an orifice for discharging liquid to form flying liquid droplets, a heat acting zone communicating with said orifice at which head energy for forming said liquid droplets can act on the liquid therein and an electrothermal transducer including at least a pair of confronting electrodes connected electrically to a heat generating resistance layer provided on a substrate to form a heat generating portion between said electrodes; and forming a protective layer by a reaction that converts material comprising said electrothermal transducer into an insulating inorganic material, wherein said reaction comprises at least one of oxidation, nitriding, boriding and carbiding of said electrothermal transducer at the surface thereof to convert said surface into at least one of an oxide, a nitride, a boride and a carbide, respectively, of the material comprising said electrothermal transducer.

4. A method according to claim 3, wherein said oxidation is effected by anodic oxidation using phosphoric acid.

* * * * *

UNITED STATES PATENT AND TRADEMARK OFFICE
CERTIFICATE OF CORRECTION

PATENT NO. : 4,694,306

DATED : September 15, 1987

INVENTOR(S) : MASAMI IKEDA, ET AL.

It is certified that error appears in the above-identified patent and that said Letters Patent is hereby corrected as shown below:

COLUMN 1

Line 26, "No. 24843064 which" should read --No. 2843064, which--.
Line 34, "form" should read --from--.
Line 35, "state is" should read --state liquid is--.
Line 41, "drop-on demand" should read --drop-on-demand--.

COLUMN 2

Line 13, "adrupt" should read --abrupt--.

COLUMN 3

Line 45, "the such" should read --the extent such--.

COLUMN 5

Line 68, "formation" should read --forming a--.

COLUMN 6

Line 60, "of heat" should read --of the heat--.

COLUMN 7

Line 59, "followed successive" should read --followed by successive--.

UNITED STATES PATENT AND TRADEMARK OFFICE
CERTIFICATE OF CORRECTION

PATENT NO. : 4,694,306
DATED : September 15, 1987
INVENTOR(S) : MASAMI IKEDA, ET AL.

It is certified that error appears in the above-identified patent and that said Letters Patent is hereby corrected as shown below:

COLUMN 8

Line 21, "layer" should read --layer,--.
Line 22, "an," should read --an--.
Line 50, "of" should read --of the--.

COLUMN 9

Line 23, "pretective" should read --protective--.

COLUMN 10

Line 28, "comprising" should read --comprising said--.
Line 39, "head" should read --heat--.

Signed and Sealed this

Ninth Day of February, 1988

*Attest:*

DONALD J. QUIGG

*Attesting Officer*

*Commissioner of Patents and Trademarks*